US008788318B1

(12) United States Patent
Niebanck

(10) Patent No.: US 8,788,318 B1
(45) Date of Patent: Jul. 22, 2014

(54) METHODS AND SYSTEMS FOR CONSOLIDATING, DISTRIBUTING AND INTEGRATING ISSUER INFORMATION FOR A VOTING ENTITY

(75) Inventor: Robert Niebanck, East Moriches, NY (US)

(73) Assignee: Broadbridge Investor Communication Solutions, Inc., Jersey City, NJ (US)

( * ) Notice: Subject to any disclaimer, the term of this patent is extended or adjusted under 35 U.S.C. 154(b) by 1609 days.

(21) Appl. No.: 11/153,115

(22) Filed: Jun. 15, 2005

Related U.S. Application Data

(60) Provisional application No. 60/646,076, filed on Jan. 21, 2005.

(51) Int. Cl.
*G06F 11/00* (2006.01)
*G07C 13/00* (2006.01)
*G06Q 40/00* (2012.01)

(52) U.S. Cl.
USPC .................................. 705/12; 705/35; 705/37

(58) Field of Classification Search
USPC ....................................................... 705/1–79
See application file for complete search history.

(56) References Cited

U.S. PATENT DOCUMENTS

| | | | |
|---|---|---|---|
| 5,218,528 A * | 6/1993 | Wise et al. ....................... 705/12 |
| 5,671,358 A * | 9/1997 | Debe et al. ........................ 705/1 |
| 5,758,097 A * | 5/1998 | Debe et al. ....................... 705/35 |
| 5,819,271 A | 10/1998 | Mahoney et al. |
| 5,864,871 A | 1/1999 | Kitain et al. |
| 5,884,327 A * | 3/1999 | Cotner et al. ................. 707/202 |
| 6,341,290 B1 | 1/2002 | Lombardo et al. |
| 6,345,293 B1 | 2/2002 | Chaddha |
| 6,492,995 B1 | 12/2002 | Atkin et al. |
| 6,557,005 B1 | 4/2003 | Burget |
| 6,623,529 B1 | 9/2003 | Lakritz |
| 6,865,543 B2 | 3/2005 | Gibbs, Sr. |
| 7,149,964 B1 | 12/2006 | Cottrille et al. |
| 2001/0034641 A1 | 10/2001 | D'Amico et al. |
| 2001/0034680 A1 * | 10/2001 | Purcell ............................ 705/35 |

(Continued)

OTHER PUBLICATIONS

ADP Investor Communication Services; ProxyEdge®, "The Complete Electronic Proxy Management System for All of Your Voting and Record Keeping Needs", Feb. 14, 2007.

(Continued)

*Primary Examiner* — Alexander Kalinowski
*Assistant Examiner* — Murali Dega
(74) *Attorney, Agent, or Firm* — Greenberg Traurig, LLP

(57) ABSTRACT

Various embodiments of the present invention relate to methods and systems for consolidating, distributing and integrating issuer information for a voting entity. More particularly, in one embodiment of the present invention a computer implemented voting method is provided, comprising: consolidating vote request information relating to a security owned by a beneficial owner and held by at least two custodians for the beneficial owner; generating at least a first computer file including the consolidated vote request information; electronically transmitting the first computer file to a computer system of a voting entity; integrating the first computer file into a database associated with the computer system of the voting entity; receiving, at the computer system of the voting entity, at least one beneficial owner vote instruction sent from the beneficial owner; and generating at least one voting entity vote instruction responsive to the consolidated vote request information, wherein the voting entity vote instruction is generated by the computer system of the voting entity based at least in part upon the integrated first computer file and the beneficial owner vote instruction from the beneficial owner.

16 Claims, 9 Drawing Sheets

(56) References Cited

U.S. PATENT DOCUMENTS

| | | | |
|---|---|---|---|
| 2001/0037234 | A1 | 11/2001 | Parmasad et al. |
| 2002/0019767 | A1* | 2/2002 | Babbitt et al. ................. 705/12 |
| 2002/0082907 | A1* | 6/2002 | Inomata et al. ................ 705/12 |
| 2003/0055719 | A1* | 3/2003 | Faigle ............................ 705/12 |
| 2004/0044612 | A1* | 3/2004 | Leroy ............................ 705/37 |
| 2004/0083159 | A1 | 4/2004 | Crosby et al. |
| 2004/0167849 | A1 | 8/2004 | Yass et al. |
| 2005/0288996 | A1 | 12/2005 | Wallman |
| 2006/0016887 | A1 | 1/2006 | Faulk |

OTHER PUBLICATIONS

ISS Global; Solutions for Institutional Investors: Proxy Voting Services; Mar. 19, 2005 http://www.issproxy.com/institutional/voting/proxyservices.jsp Copyright © 2005 Institutional Shareholder Services.

ISS Global; Solutions for Institutional Investors: ISS' Proxy Voting Process; Mar. 19, 2005 http://www.issproxy.com/institutional/voting/proxyvotingprocess.jsp Copyright © 2005 Institutional Shareholder Services.

ISS Global; Solutions for Institutional Investors: Proxy Voting Services—Electronic Voting; Mar. 19, 2005 http://www.issproxy.com/institutional/voting/electronicvoting.jsp Copyright © 2005 Institutional Shareholder Services.

Printout of Jun. 4, 2004 webpage of http://central.proxyvote.com/proxyvote/index2.jsp (retrieved from http://web.archive.org/web/*/http://central.proxyvote.com/proxyvote/index2.jsp on Oct. 18, 2007)—submission includes 1 page of proxyvote webpage and 1 page web.archive search results.

ProxyEdge Demo http://web.archive.org/web/20030429005603/ics.adp.com/release7/public_site/products/ins . . . Obtained 2003, 14 pages.

ADP Link Product Development Announcement Proxy Edge® 2000, 2 pages.

ADP Investor Communication Services, Proxy Edge User Group. Obtained 2003, 17 pages.

ICS Investor Communication Services http://web.archive.org/web/20020307120924/ics.adp.com/release6/public_site/products/Institutions/p . . . Jan. 18, 2010, 2 pages.

ADP Investor Communication Services, Proxy Edge® Lite, 2001, 1 page.

Highlights of the Automatic Data Processing, Investor Communication Services (ADP ICS) Steering Committee Meeting Monday, Oct. 2, 2000, Westin Westminster, Westminster, Colorado, 7 pages.

Highlights of the Automatic Data Processing, Investor Communication Services (ADP ICS) Steering Committee Meeting Monday, Mar. 13, 2000, The Washington Court Hotel, Washington, DC, 16 pages.

Highlights of the Institutional User Group, Oct. 6, 1997, Scottsdale, Arizona, 9 pages.

Highlights of the Bank/Broker User Group Meetings, Jan. 13, 1998 Chicago, Jan. 21, 1998 San Francisco, Jan. 27, 1998, Journal Square, 11 pages.

ADPLink, Investor Communication Services, Proxy Edge® Lite Continues to Grow! Apr. 2003, 4 pages.

ADPLink, A Shareholder Communication Bulletin, vol. 4., No. 2, Dec. 2000, 4 pages.

LexisNexis® Headline: ADP Technology Brings Proxy Distribution and Voting on the Internet to Beneficial and Registered Shareowners, Copyright 1998 Business Wire, Inc. Jan. 6, 1998, 2 pages.

"Why Choose EC Proxy" document; EC Proxy Voting Services, Inc.; 1 pg.; found on www.ecproxyvoting.com/whychose.htm.

"EC Proxy Voting Services" document; EC Proxy Voting Services, Inc.; 2 pg; found on www.ecproxyvoting.com/services.htm.

"Voting FAQS" document; RR Donnelley, RealCorporateLawyer.com; 11 pgs; found at www.realcorporatelawyer.com/faqs/voting.html.

"Online Voting Wizard" document; EquiServe; found at www.eproxy.com/cgi-bin/voting.cgi?agent=equiserve; 2 pgs.

"About Us" document; Computershare Limited; found at www.us.computershare.com/About/default.asp; 1 pg.

"Client" document; Computershare Limited; found at www.us.computershare.com/issuer/logint.asp; 1 pg.

Section 1, "System Overview", Proxy Edge. (5 pages).

ISS, "Voting Services for Institutional Investors". (6 pages).

ISS, "Proxy Voting Process", web browser screenshot. (2 pages).

ISS, "Proxy Voting Services", web browser screenshot. (2 pages). (https://east.proxyvote.com/proxyvote/index2.jsp); "ProxyVote", web browser screenshot. (1 page).

* cited by examiner

METHODS AND SYSTEMS FOR CONSOLIDATING, DISTRIBUTING AND INTEGRATING ISSUER INFORMATION FOR A VOTING ENTITY

RELATED APPLICATIONS

This application claims the benefit of U.S. Provisional Application Ser. No. 60/646,076, filed Jan. 21, 2005.

FIELD OF THE INVENTION

Various embodiments of the present invention relate to methods and systems for consolidating, distributing and integrating issuer information for a voting entity.

More particularly, in one embodiment of the present invention a computer implemented voting method is provided, comprising: consolidating vote request information relating to a security owned by a beneficial owner and held by at least two custodians for the beneficial owner; generating at least a first computer file including the consolidated vote request information; electronically transmitting the first computer file to a computer system of a voting entity; integrating the first computer file into a database associated with the computer system of the voting entity; receiving, at the computer system of the voting entity, at least one beneficial owner vote instruction sent from the beneficial owner; and generating at least one voting entity vote instruction responsive to the consolidated vote request information, wherein the voting entity vote instruction is generated by the computer system of the voting entity based at least in part upon the integrated first computer file and the beneficial owner vote instruction from the beneficial owner.

For the purposes of the present invention, the term "security" means any financial instrument (or series of instruments) which is issued by a corporation, government, or other entity and which offers evidence of equity or debt.

Further, for the purposes of the present invention, the term "issuer" means any entity issuing a security.

Further still, for the purposes of the present invention, the term "custodian" means any entity that holds and safeguards a security owned by a beneficial owner and includes, but is not limited to, for example, a bank, a broker or a trust company.

Further still, for the purposes of the present invention, the term "beneficial owner" means the entity entitled to the benefits of ownership even though another party such as a custodian actually has possession and/or title to the security.

Further still, for the purposes of the present invention, the term "voting entity" means an entity authorized to transmit voting instructions on behalf of a beneficial owner.

Further still, for the purposes of the present invention, the term "institutional shareholder" means an entity that is the ultimate beneficial owner of a publicly traded security and includes, but is not limited to, for example, an investment manager/advisor, a private and/or public pension fund manager and/or an investment company.

BACKGROUND OF THE INVENTION

Rules and regulations promulgated by the U.S. Securities and Exchange Commission and various self-regulatory organizations (e.g., New York Stock Exchange) typically require issuers of publicly traded securities to distribute certain information to the ultimate beneficial owners of their securities. Such information typically includes notices of shareholder meetings and proxy statements that contain proposals to be voted upon by shareholders. In this regard, institutional shareholders commonly hold securities through at least one, but typically several, custodians in "street" name (institutional shareholders use more than one custodian for purposes including asset protection and/or a means of managing services and fees).

Various mechanisms for information distribution and voting have been proposed. Examples include the mechanisms described in the following U.S. patent documents.

U.S. Pat. No. 5,671,358 relates to a system for voting stock component interests.

More particularly, this patent relates to a data processing system for processing the voting of partial stock interests via equity and options, comprising computer means for determining and storing component factors for equity and for calculating and storing component factors for options and vote component factors corresponding to each of said component factors for options, wherein each said vote component factor is indicative of the right to receive a partial vote attributed to each of said component factors for options, wherein said component factors for options are at least two of: (i) a component interest indicative of the right to receive a partial share of stock equal in value to a stipulated price or a full share of stock of the company on a predetermined future date, whichever is the lesser value; (ii) a component interest indicative of the right to receive a partial share of stock equal in value to the appreciation, if any, of the share of stock above the stipulated price on the predetermined date; (iii) a component interest indicative of the right to receive substitute payments equal in amount to dividends declared with respect to a given date which is prior to the predetermined future date and which goes to zero value at the predetermined future date.

U.S. Pat. No. 5,758,097 relates to a system for voting stock component interests. More particularly, this patent relates to a data processing system for processing the voting of partial stock interests via equity components comprising computer means for calculating and storing component factors for equity component interests and vote component factors corresponding to each of said component factors, wherein each said vote component factor is indicative of the right to receive a partial vote attributed to each of said equity component factors, wherein said equity component factors are at least two of: (i) a component interest indicative of the right to receive a partial share of stock equal in value to a stipulated price or a fall share of stock of the company on a predetermined future date, whichever is the lesser value; (ii) a component interest indicative of the right to receive a partial share of stock equal in value to the appreciation, if any, of the share of stock above the stipulated price on the predetermined date; and (iii) a component interest indicative of the right to receive substitute payments equal in amount to dividends declared with respect to a given date which is prior to the predetermined future date and which goes to zero value at the predetermined future date.

U.S. Pat. No. 5,819,271 relates to a corporate information communication and delivery system and method including entitlable hypertext links. More particularly, this patent relates to an integrated computer-implemented corporate information delivery system. A database stores research reports produced by and received electronically from brokerage firms. Authorization information specifies who is authorized to access each research reports. The database also stores corporate information about a number of corporations. Each item of corporate information is produced by and received electronically from one of the corporations about that corporation. Authorization information specifies who is authorized to access each item of corporate information. A research delivery module allows a user to submit a query and receive query results listing research reports and corporate information satisfying the query and that the user is authorized to access. A corporate register module outputs corporate information, the corporate information output according to a common format. The corporate information may be distributed via the Internet.

U.S. Pat. No. 5,864,871 relates to an information delivery system and method including on-line entitlements. More particularly, this patent relates to an integrated computer-implemented corporate information delivery system. A database stores research reports produced by and received electronically from brokerage firms. The database also stores corporate information about a number of corporations. Each item of corporate information is produced by and received electronically from one of the corporations about that corporation. Authorization information ("entitlements") specifies who is authorized to access each research report or item of corporate information. An entitlement subsystem allows the contributor of the research report or item of corporate information to dynamically change, on-line, the entitlement status of any or all users/subscribers. A research delivery module allows a user to submit a query and receive query results listing research reports and corporate information satisfying the query and that the user is authorized to access. A corporate register module outputs corporate information, the corporate information output according to a common format. The corporate information may be distributed via the Internet.

U.S. Pat. No. 6,341,290 relates to a method and system for automating the communication of business information. More particularly, this patent relates to a system comprising a server operable to capture business information from a plurality of sources, capture distribution information associated with the business information, integrate the captured information in a standardized format, and display the captured information. The system also comprises a database operable to communicate with the server. The database is operable to store the captured information and communicate the captured information to the server.

U.S. Pat. No. 6,865,543 relates to a vote certification, validation and verification method and apparatus. More particularly, this patent relates to an election apparatus for voter certification, validation and verification of voting, providing a voting device for receiving from a voter a vote for at least one ballot selection in an election and a generator that provides a voter validation receipt bearing a voter validation number containing indicia of the voter and a report of the voting by the voter. An accessor responsive to the voter validation number enables the voter to validate the vote by comparing a report of the vote with an election result tabulated by a vote tabulation center. An election method is disclosed for voters to certify, validate, and verify votes tabulated by a vote tabulation center.

U.S. Patent Application 20010034680 relates to a system and method for online delivery of investor documents and tabulation and processing certain investor instructions. More particularly, this application relates to a system for online delivery of documents to Investors, and for receiving voting or tendering instructions from investors including an E-broker system with a database that sends information to and receives information from an Investor through an investor system. The system also includes an electronic dissemination and tabulation system ("EDT") for securely delivering information directly to or receiving information directly from the investor system in response to an Investor request sent via the E-broker system. Furthermore, the EDT system sends information to the investor system in correspondence to stock holdings of the Investor as recorded in the E-broker system.

U.S. Patent Application 20010037234 relates to a method and apparatus for determining a voting result using a communications network. More particularly, this application relates to sending consent email messages to each of the potential voters that may vote to determine the result of the voting decision. The consent email message includes a hyperlink (URL) to a consent website, where potential voters can access the consent website to provide consent information. Once the consent information for the potential voters has been gathered, a set of eligible voters is determined from the potential voters based on those which provided consent information. The consent information can include consent to receive electronic information regarding the voting decision as well as consent to vote electronically. Based on the set of eligible voters determined, a second email message is sent to each of these eligible voters, where the second email message provides notification of a voting website to these eligible voters. When the eligible voters access the voting website, their identity is validated, and voting information is collected from those eligible voters who consented to vote electronically. Additionally, the voting website may provide the links to the electronic format information corresponding to the voting issue. When an eligible voter casts his/her vote, the voting information provided in the vote is compiled to determine the final voting decision. Compilation may include storing the voting information in a database, and may also include generating and sending transfer agent email messages that provide the voting information to a transfer agent that is responsible for tallying all of the votes that are cast.

U.S. Patent Application 20020082907 relates to a method for conducting a shareholders meeting with remote participation using a network. More particularly, this application relates to a method for conducting a shareholders meeting when shareholders can participate in the shareholders meeting through a network without having to actually go to the meeting hall of the shareholders meeting. Remote shareholders are assigned to satellite sites in order to spread the processing load among the satellite sites. Among the meeting site, satellite sites, and remote shareholder sites of the sponsoring company, votes from remote shareholders sites are tabulated on the satellite sites and sent to the meeting site.

U.S. Patent Application 20030055719 relates to remote participation and voting in a meeting. More particularly, a system and method for non-attending members of a group to remotely participate in a voting meeting through a network such as the Internet is provided. The system includes authentication, broadcast and voting computers which work together to authenticate the online members, broadcast the meeting to the authenticated members, and receive votes from the authenticated online members.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1:
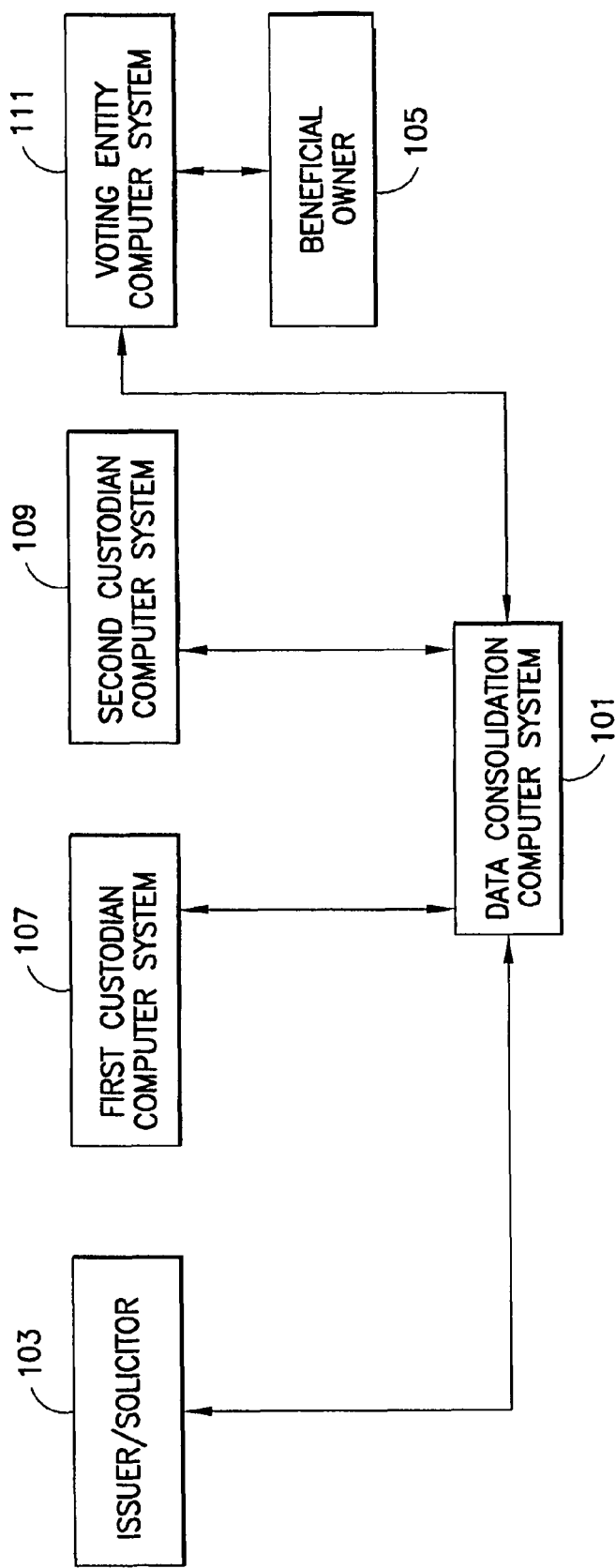
FIG. 1 is a block diagram of an information exchange infrastructure according to an embodiment of the present invention.

Referring now to FIG. 1, it is seen that in one embodiment of the present invention a Data Consolidation Computer System 101 receives notice from a securities issuer or their agent (e.g. Vanguard Capital Management, Verizon Communications, Morrow & Co. or D.F. King) that a distribution of certain issuer information (e.g. notice of meeting, agenda, director and/or ballot information) to the ultimate beneficial owner of the issuer's security is desired and/or required. In one example (which example is intended to be illustrative and not restrictive), the notice may be sent by letter, fax or email and may be input into the Data Consolidation Computer System 101 via manual data entry. In another example (which example is intended to be illustrative and not restrictive), the notice may be sent electronically in the form of a computer file from an exchange computer system (not shown) to the Data Consolidation Computer System 101.

In any case, the Data Consolidation Computer System 101 then generates and sends a request to first and second designated custodians associated with Beneficial Owner 105 (i.e., the beneficial owner of the security which is the subject of the notice from Issuer/Solicitor 103). The request may be for certain information (e.g. the names, addresses, share positions and/or account numbers) associated with Beneficial Owner 105. In one example (which example is intended to be illustrative and not restrictive), the request may be in the form of a computer file sent electronically from the Data Consolidation Computer System 101 to First Custodian Computer System 107 and Second Custodian Computer System 109. In another example (which example is intended to be illustrative and not restrictive), the request may be sent to one or more custodians by letter, fax or email and may be input into an appropriate computer system via manual data entry.

Each of the First Custodian Computer System 107 and Second Custodian Computer System 109 then responds and returns the requested information to the Data Consolidation Computer System 101. In one example (which example is intended to be illustrative and not restrictive), the response may be in the form of a computer file sent electronically from each of the First Custodian Computer System 107 and Second Custodian Computer System 109 to the Data Consolidation Computer System 101. In another example (which example is intended to be illustrative and not restrictive), the response may be sent by one or more custodians by letter, fax or email and may be input into Data Consolidation Computer System 101 via manual data entry. Of note, each custodian may be requested or required to respond within a specified time period (e.g. within two business days).

Figure 3A:
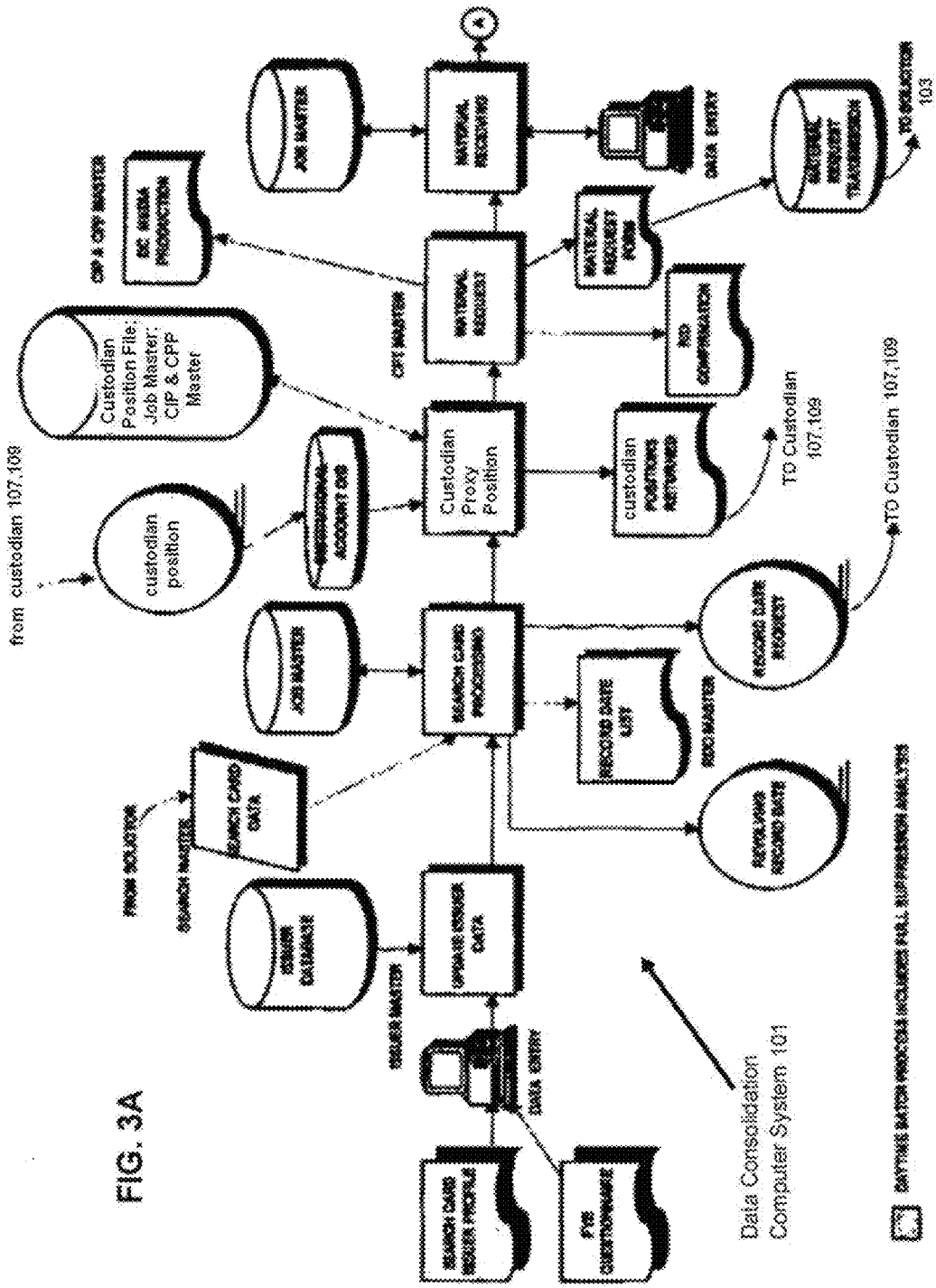
FIGS. 3A, 3B and 3C are flow charts of an embodiment of the present invention related to: receiving notice from a particular issuer of securities or their agent (solicitor) that a distribution of certain issuer information to an ultimate beneficial holder of a security is desired and/or required; consolidating the information against an institutional account database for a particular voting entity; transmitting the issuer and custodian information to a designated voting entity; integrating the information into the voting entity's system; receiving the voting instructions from the voting entity; validating and confirming the voting instructions; and reporting the voting instructions.
Figure 3B:
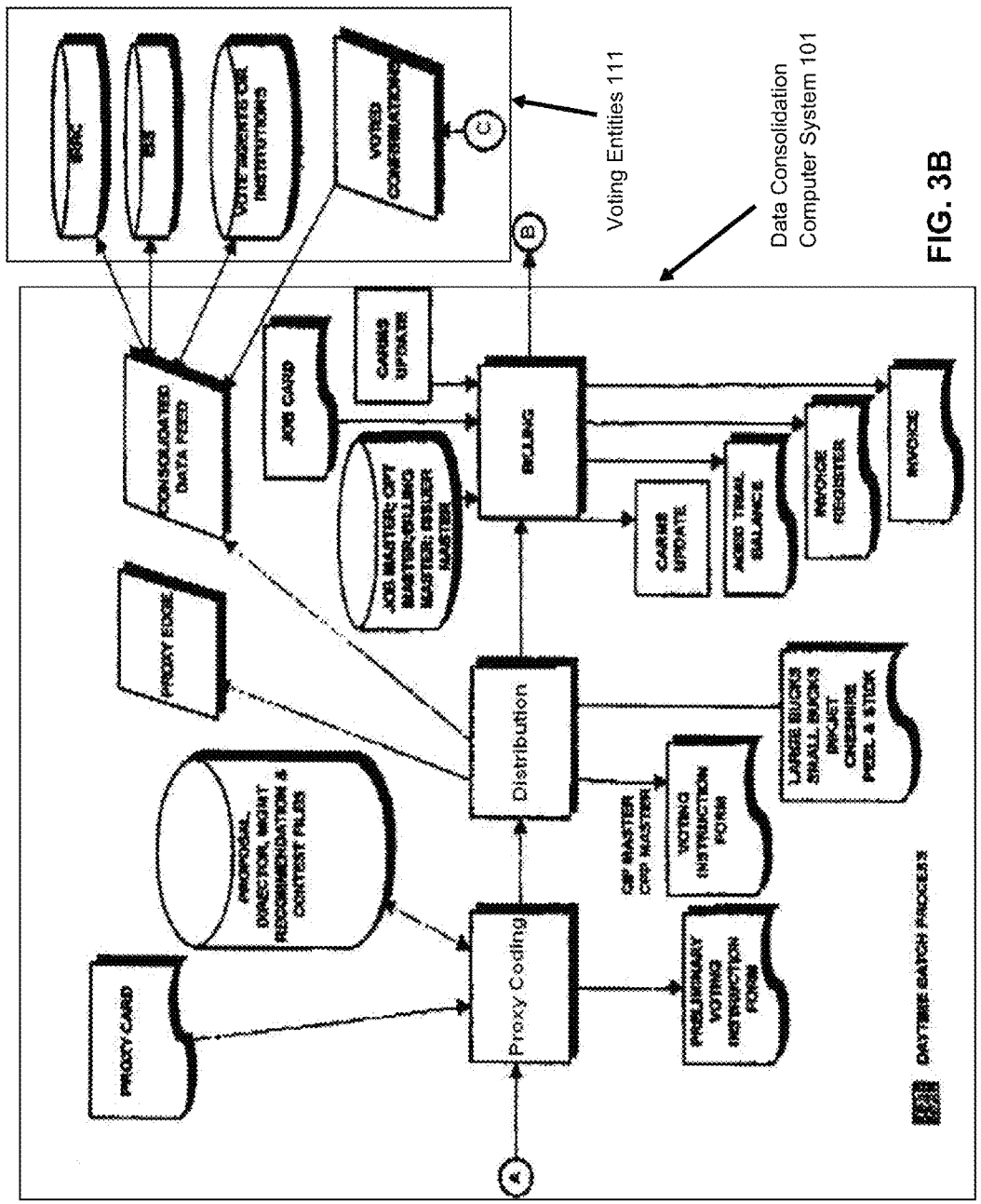
Figure 4A:
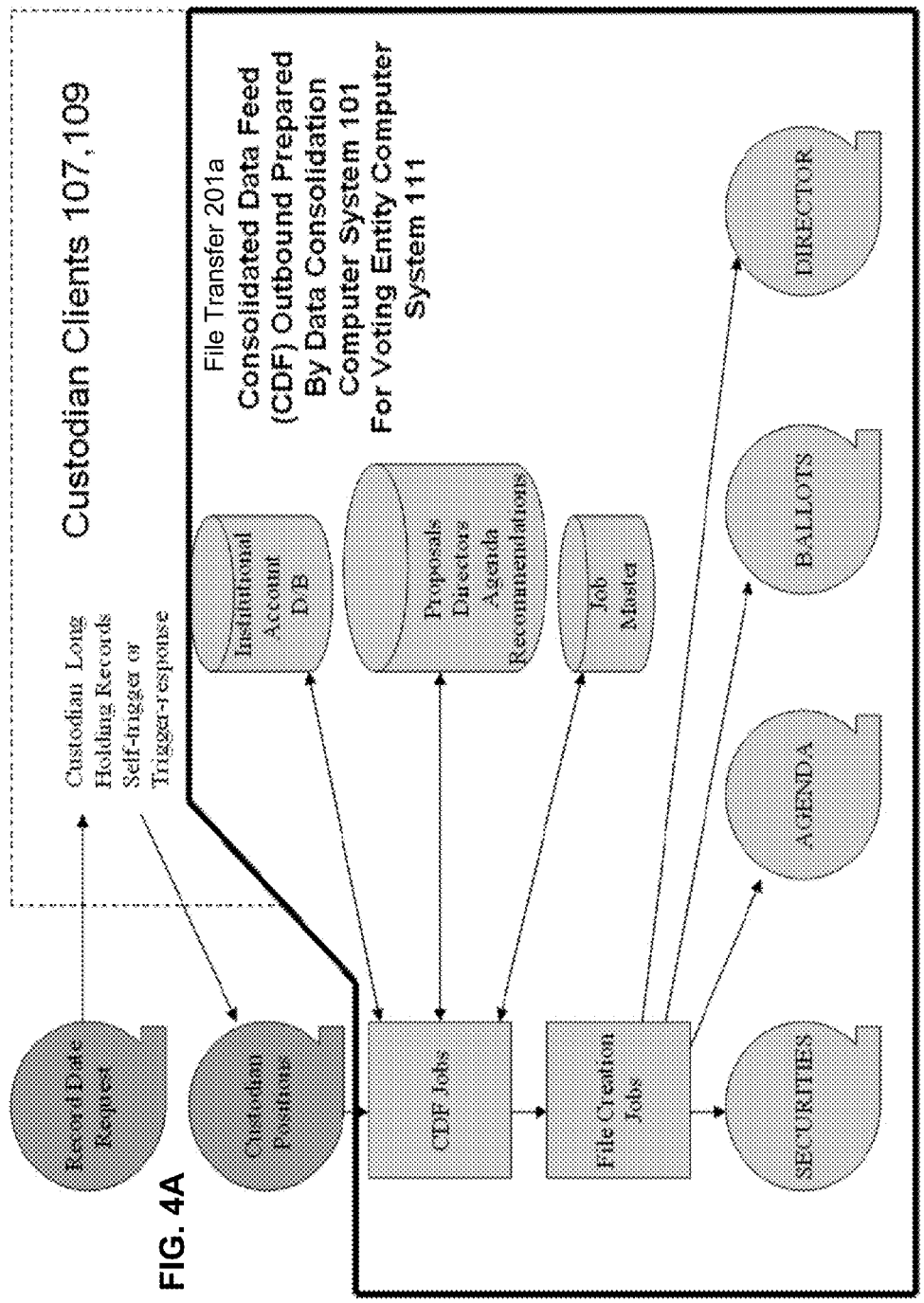
FIGS. 4A, 4B and 4C are flow charts of an embodiment of the present invention related to: receiving notice from a particular issuer of securities or their agent (solicitor) that a distribution of certain issuer information to an ultimate beneficial holder of a security is desired and/or required; consolidating the information against an institutional account database for a particular voting entity; transmitting the issuer and custodian information to a designated voting entity; integrating the information into the voting entity's system; receiving the voting instructions from the voting entity; validating and confirming the voting instructions; and reporting the voting instructions.
Figure 4B:
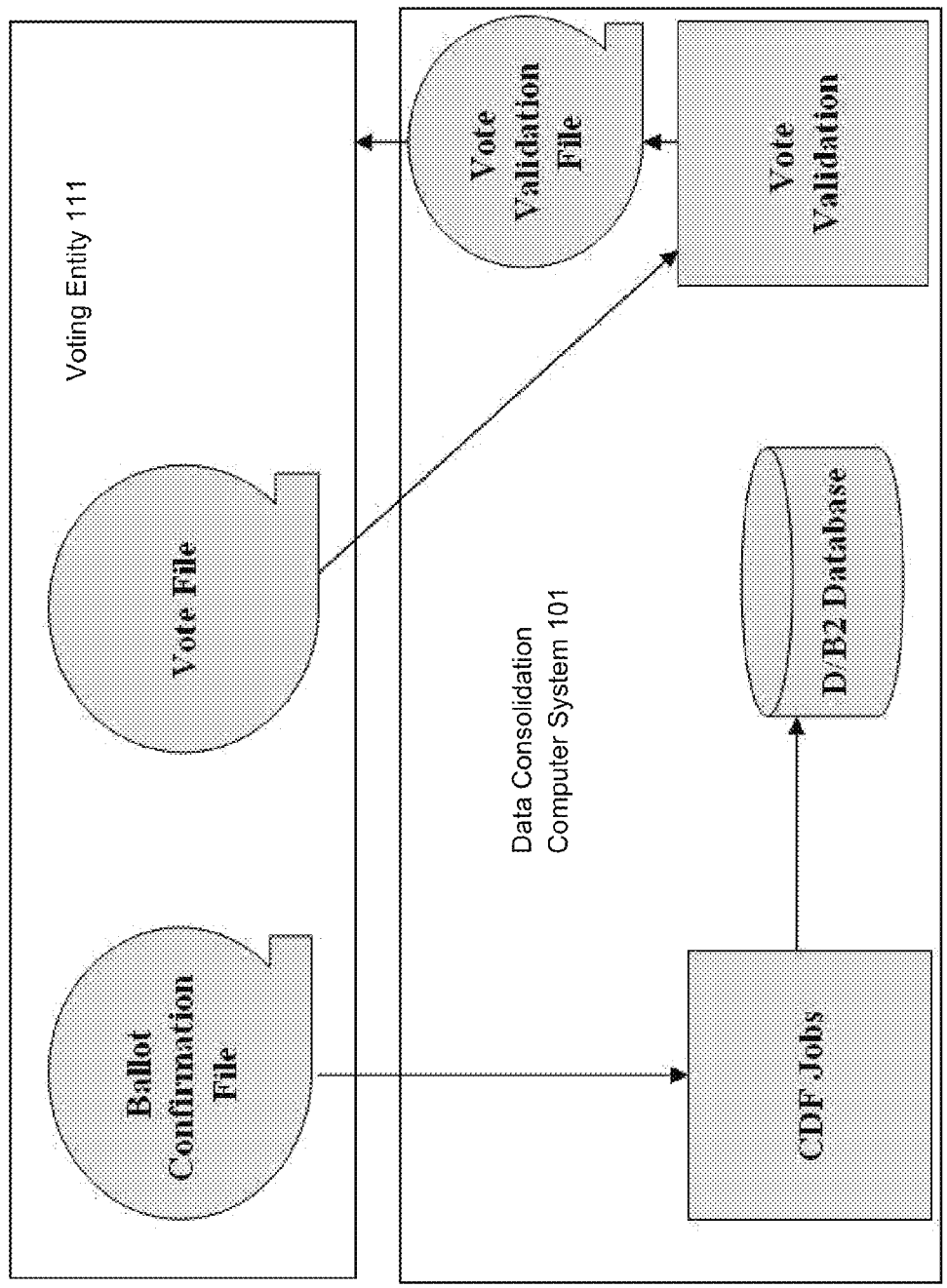
Figure 4C:
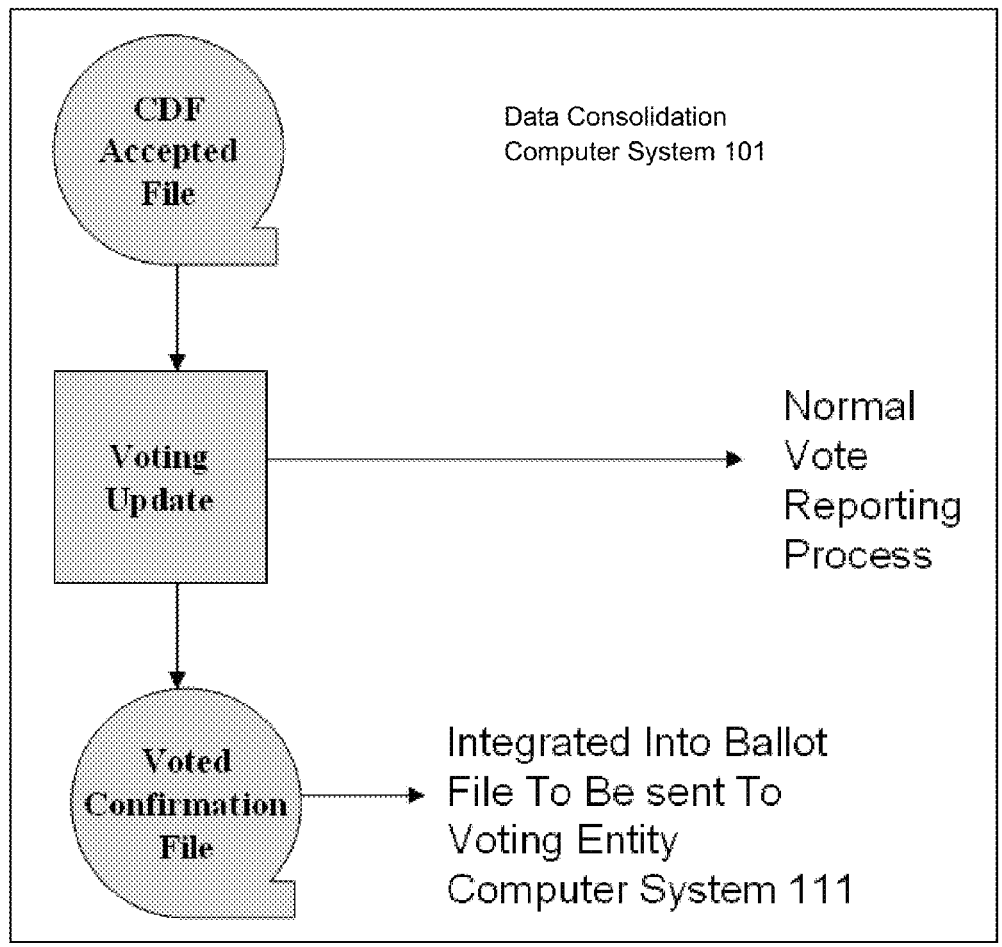
Figure 5:
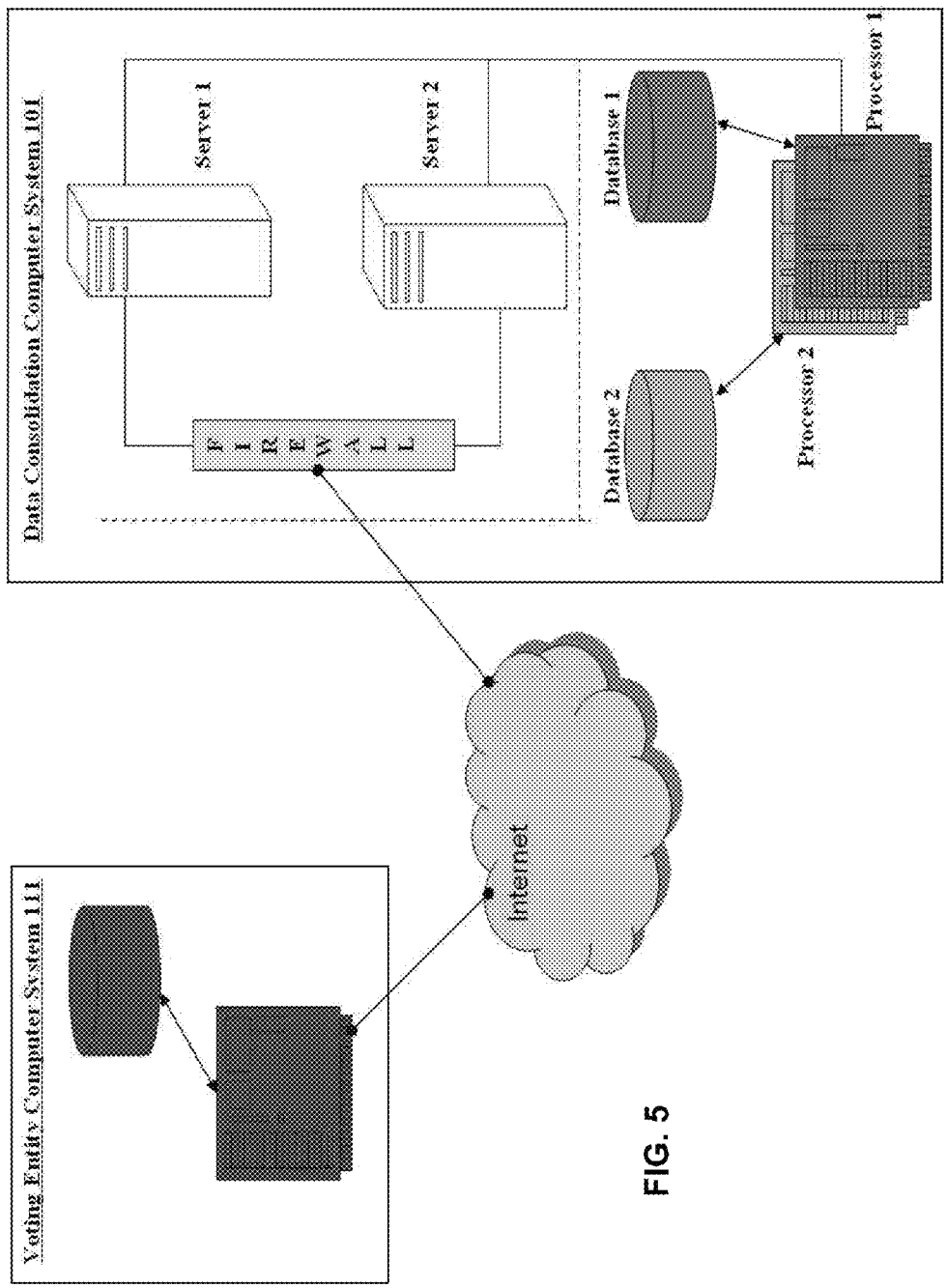
FIG. 5 is a block diagram of an information exchange infrastructure according to another embodiment of the present invention.

In any case, after the Data Consolidation Computer System 101 receives the requested information from the First Custodian Computer System 107 (or manually from the custodian associated therewith) and the Second Custodian Computer System 109 (or manually from the custodian associated therewith), the Data Consolidation Computer System 101 matches the requested information against an institutional account database (see, e.g., FIGS. 3A and 4A). The Data Consolidation Computer System 101 then consolidates the issuer information and prepares the issuer information to be transmitted.

In one example (which example is intended to be illustrative and not restrictive), this sending is based on an "InstID" for a particular consolidated data feed client. Further, the consolidated issuer information may be transmitted at a specified time period (e.g. each business night) to Voting Entity Computer System 111. In another example, a secure "File Transmission Protocol" with transmission encryption transmits the consolidated issuer information. In another example (which example is intended to be illustrative and not restrictive), the issuer information (e.g. each of the files) is transmitted uniquely and provides positive confirmation that the full file has been received at the destination IP address. In another example, the transmission process can be fully automated.

In yet another example, the presence of a file in an outbound mailbox associated with the Data Consolidation Computer System 101 may initiate an automated scheduler task that sends the file to the IP address associated with the file. In yet another example, a confirmation process may be employed (e.g., upon successfully sending the file(s), a notification (e.g. email) may be generated and sent to the Data Consolidation Computer System 101 indicating that the file(s) have been successfully transferred). In another example, an assigned time window may be established and thus, if the assigned time window elapses before the file(s) are successfully transmitted, a notification may be generated.

In any case, once the Voting Entity Computer System 111 receives the consolidated issuer information (including, for example, vote request information (or ballots)), the issuer information is integrated into the Voting Entity Computer System 111. For example (which example is intended to be illustrative and not restrictive), software may be used to convert the issuer information into the protocol of the Voting Entity Computer System 111 and then such converted information may be inserted into one or more databases associated with the Voting Entity Computer System 111.

In a further embodiment, the Voting Entity Computer System 111 sends a notification (e.g. ballot confirmation file) to the Data Consolidation Computer System 101 to confirm that the Voting Entity Computer System 111 received and/or integrated the issuer information. In one example, if the Data Consolidation Computer System 101 does not receive such notification (e.g. the Voting Entity Computer. System 111 did not confirm that the issuer information was received and/or integrated), the Data Consolidation Computer System 101 may continue to send the information until the Data Consolidation Computer System 101 receives such confirmation.

Finally, the Voting Entity Computer System 111 responds to the Data Consolidation Computer System 101 with vote instructions. In one example (which example is intended to be illustrative and not restrictive), these vote instructions to the Data Consolidation Computer System 101 may be based upon instructions received by the voting entity from Beneficial Owner 105. In another example (which example is intended to be illustrative and not restrictive), the vote instructions may be derived from the 'standing instructions' of the voting entity. (e.g., always vote with management proposals; always vote against shareholder proposals). In another example (which example is intended to be illustrative and not restrictive), the vote instructions may be derived from the research available as applied to the policy of the institution based on the type of proposal (e.g. vote against executive compensation proposals where dilution exceeds 3%). In another example (which example is intended to be illustrative and not restrictive), the instructions may be sent by letter, fax or email from the Beneficial Owner 105 to the voting entity and may be input into the Voting Entity Computer System 111 via manual data entry. In another example (which example is intended to be illustrative and not restrictive), the instructions may be sent electronically in the form of a computer file from a beneficial owner computer system (not shown) to the Voting Entity Computer System 111.

In additional embodiments relating to certain issuer information that is "issuer ballot information," the types of votes returned by the Voting Entity Computer System 111 to the Data Consolidation Computer System 101 with a vote instruction may include, but are not necessarily limited to: domestic vote, contest vote and/or non-North American vote. For example, each of these votes may have a corresponding file and thus, each file may contain a specific type of vote (e.g., that may be processed on a different schedule than the other types). In this regard, domestic votes may be sent in a "DomesticVote" File, contest votes may be sent in a "ContestVote" File and non-North American votes may be sent in a "GlobalVote" File. In another example, domestic votes may be the most prolific and thus, may be sent numerous (e.g. three) times daily. In another example, non-North American votes may be sent to coincide with a global voting cycle. In a further example, contest votes may be done on request or once daily if there are contested meetings in their solicitation period.

In a further embodiment, the voting instructions are automatically validated upon receipt by the Data Consolidation Computer System 101 (including a receipt to the Voting Entity Computer System 111 that the voting instruction has been accepted by the Data Consolidation Computer System 101 for processing in the next update, or the voting instruction has been rejected for a specific reason).

In another example, the voting entity reviews (e.g., via the Voting Entity Computer System 111) the receipt from the voting instruction validation and can correct any voting instruction that has been rejected. The voting entity can then either resubmit or delete the voting instruction (the review/resubmit/delete process may be carried out manually or automatically). Consequently, based on the validation process, the voting entity can account for all records of the voting instruction including voting instruction sent, voting instruction accepted and/or voting instruction rejected.

In a further embodiment, the accepted voting instructions are then entered into the Data Consolidation Computer System 101 for processing and subsequent reporting to the appropriate tabulator, solicitor, sub-voting entity transfer agent and/or equivalent entity.

Figure 3C:
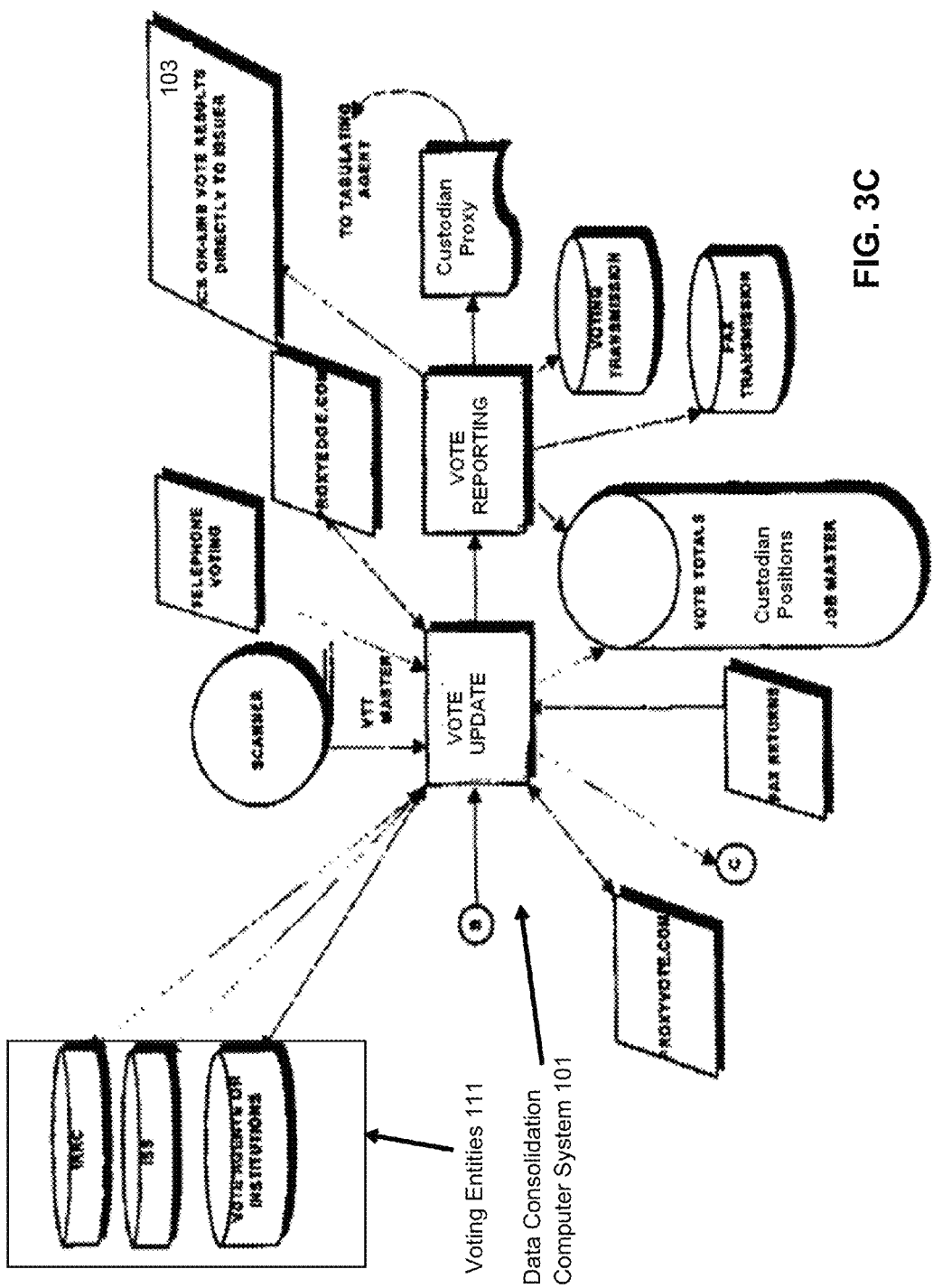

In a further embodiment (see e.g., FIG. 3C), a ballot record of an entry of a voting instruction is prepared for distribution to the voting entity. For example, the ballot record may include all voting instructions processed and when they were processed including, for example, the specified time (e.g. day/date/hours/minutes/seconds). In another example, the ballot record may include information about when the voting instruction was processed as well as how the voting instruction was cast and thus, provide a confirmation to the voting entity of exactly how and when the voting instruction occurred.

Figure 2:
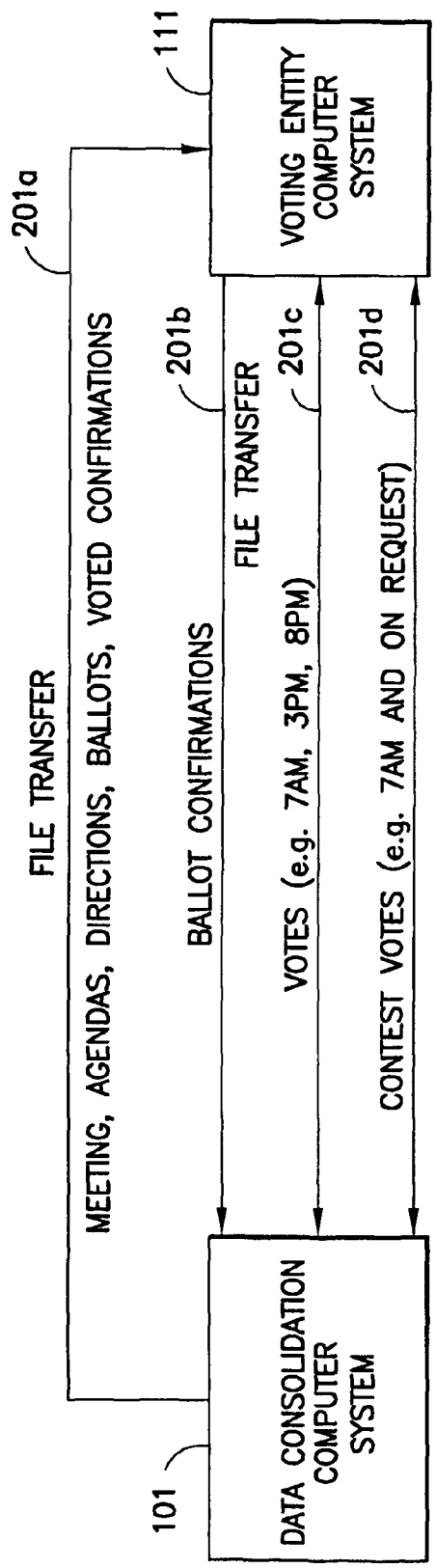
FIG. 2 is a block diagram detailing information exchanged between various elements of FIG. 1.

Reference is now made to FIG. 2, showing details of the information flow (including consolidated data feed) between Data Consolidation Computer System 101 and Voting Entity Computer System 111. In this FIG. 2, the consolidated data feed comprises meeting, agenda, director, ballot and vote confirmation information. It is to be understood, of course, that the various specifics presented in connection with this embodiment (e.g., file names, file types, number of files, event times, etc) are simply examples provided for illustrative purposes only, and are not restrictive.

In any case, it is seen that under this embodiment a consolidated data feed runs from the Data Consolidation Computer System 101 to the Voting Entity Computer System 111 through File Transfer 201a. In one example, File Transfer 201 may comprise four files: one "Meeting File; one "Agenda file"; one "Director File"; and one "Ballot File" (which may include both new ballots and ballots with voted confirmations (e.g., in a specified format)). In another example, the consolidated data feed may run daily. In another example, the consolidated data feed may run daily at nightly updates that reflect the daily ballot generation and vote confirmations.

In addition to a protocol confirmation which may be carried out in connection with the above-mentioned File Transfer 201 from Data Consolidation Computer System 101 to Voting Entity Computer System 111, Voting Entity Computer System 111 may produce a "Ballot-Confirm File" to be transmitted back to the Data Consolidation Computer System 101 through File Transfer 201b (which File Transfer 201b back to Data Consolidation Computer System 101 may include one or more "Result Codes").

For the voting entity's vote instructions (see File Transfer 201c), the Voting Entity Computer System 111 provides to the Data Consolidation Computer System 101a "Domestic Vote File," for all the voting entity's vote instructions for all ballots received from the Data Consolidation Computer System 101 with a first type of control indicia or code (e.g., a twelve-digit control number). In one example, the voting entity may provide instructions to the Data Consolidation Computer System 101 as soon as the instructions are available. In another example, a "Domestic Vote File" instruction file transfer may run from the voting entity to the Data Consolidation Computer System 101 for a specified number of times per day (e.g. no less than three times each business day at mutually agreed upon schedules). In one specific example (which example is intended to be illustrative and not restrictive), the runs may occur at: 7 AM (which may reflect appropriate votes beginning with "Day of Meeting Voting Reports"; 3 PM (which may reflect appropriate votes beginning with "Final Voting Reports"; and 10 PM (which may reflect appropriate votes beginning with "Day Before Meeting Voting Reports".

The voting entity also provides to the Data Consolidation Computer System 101a "Global Vote File," for all the voting entity's vote instructions for all ballots received from the Data Consolidation Computer System 101 with a second type of control indicia or code (e.g., a thirteen-digit control number). In one example, the "Global Vote File" instruction file transfer runs from the Voting Entity Computer System 111 to the Data Consolidation Computer System 101 for a specified number of times per day (e.g. daily at a mutually agreed upon schedule such as prior to 1 PM—which will then be reflected in the daily distribution of global votes for that same day).

Further, "Contest Votes" may be transmitted in a similar manner through File Transfer 201d.

In addition, confirmations associated with the various votes sent from the Voting Entity Computer System 111 to the Data Consolidation Computer System 101 may be sent back to the Voting Entity Computer System 111 from the Data Consolidation Computer System 101 through File Transfers 201c and 201d.

For security purposes, the various file transfers may be fully encrypted. In one example, the Voting Entity Computer System 111 and the Data Consolidation Computer System 101 may use known hosts authentication, and transfer files between hosts with known keys (there may be an exchange of host keys and use of these keys to verify the host machine). In another example, the various file transfers may utilize a checksum file (e.g., MD5 checksum).

Continuing with the above-mentioned embodiment of the present invention directed to a consolidated data feed comprising meeting, agenda, director and ballot information, the following provides more specific examples of the interaction between the outbound consolidated data feed from the Data Consolidation Computer System 101 to the Voting Entity Computer System 111 and inbound information from the Voting Entity Computer System 111 to the Data Consolidation Computer System 101. Again, of course, it is to be understood that the various specifics presented in connection with this embodiment (e.g., file names, file types, number of files, event times, etc) are simply examples provided for illustrative purposes only, and are not restrictive.

In any case, for the outbound consolidated data feed process (i.e., from the Data Consolidation Computer System 101 to the Voting Entity Computer System 111), file names may be established as follows for the corresponding information: Voting Entityagenda.dat; Voting Entityballot.dat; VotingEntitydirector.dat; VotingEntitysecurity.dat; and flag.dat. Of note, the "VotingEntity" portion of the filename may be replaced by the actual name of the voting entity to which the file is directed and the agenda, director, ballot and security data for each file may contain appropriate issuer data.

In one specific example (which example is intended to be illustrative and not restrictive), the files for the outbound consolidated data feed process may be processed and then placed on a PGP server during a designated time window (e.g. between 1:30 AM and 4:30 AM every Tuesday-Saturday morning). The files for the outbound consolidated data feed process may then be "PUT" to an FTP server to be picked-up by the voting entity.

In this regard, any failure or confirmation emails may be sent and/or received within above-mentioned designated time window (if any required email(s) are not received within this time window, appropriate escalation and/or remediation procedures may be carried out).

For the inbound ballot confirmation process (i.e., from the Voting Entity Computer System 111 to the Data Consolidation Computer System 101), a file named VotingEntityBallConf.dat.pgp may be established. This VotingEntityBallConf.dat.pgp file may be generated in response to the VotingEntityballot.dat file from the consolidated data feed process. This Voting EntityBallConf.dat.pgp file may be expected to be received by the Data Consolidation Computer System 101 during a designated time window (e.g. between 8 AM and 10 AM every Monday-Friday).

Again, any failure or confirmation emails may be sent and/or received within above-mentioned designated time window (if any required email(s) are not received within this time window, appropriate escalation and/or remediation procedures may be carried out).

For a first time period inbound vote process (i.e., from the Voting Entity Computer System 111 to the Data Consolidation Computer System 101), a file named VotingEntityDom__7.dat.pgp may be established. This first time period inbound vote process may occur at about 7 AM, such that the VotingEntityDom__7.dat.pgp file may be expected to be received, for example, every Monday-Friday between 6 AM and 8 AM.

Again, any failure or confirmation emails may be sent and/or received within the appropriate time window (if any required email(s) are not received within this time window, appropriate escalation and/or remediation procedures may be carried out).

For a first time period outbound vote process (i.e., from the Data Consolidation Computer System 101 to the Voting Entity Computer System 111), a file named VotingEntityOutD07.dat may be established. This VotingEntityOutD07.dat file is generated in response to the first time period inbound vote file named VotingEntityDom__7.dat.pgp and this VotingEntityOutD07.dat file may be expected to be processed during a specified time frame (e.g. every Monday-Friday between 6 AM and 9 AM).

Again, any failure or confirmation emails may be sent and/or received within the appropriate time window (if any required email(s) are not received within this time window, appropriate escalation and/or remediation procedures may be carried out).

For a second time period inbound vote process (i.e., from the Voting Entity Computer System 111 to the Data Consolidation Computer System 101), a file named VotingEntityDom__15.dat.pgp may be established. This first time period inbound vote process may occur at about 3 PM, such that the VotingEntityDom__15.dat.pgp file may be expected to be received, for example, every Monday-Friday between 2 PM and 4 PM.

Again, any failure or confirmation emails may be sent and/or received within the appropriate time window (if any required email(s) are not received within this time window, appropriate escalation and/or remediation procedures may be carried out).

For a second time period outbound vote process (i.e., from the Data Consolidation Computer System 101 to the Voting Entity Computer System 111), a file named VotingEntityOutD015.dat may be established. This VotingEntityOutD015.dat file is generated in response to the second time period inbound vote file named VotingEntityDom__15.dat.pgp and this VotingEntityOutD015.dat file may be expected to be processed during a specified time frame (e.g. every Monday-Friday between 2 PM and 5 PM).

Again, any failure or confirmation emails may be sent and/or received within the appropriate time window (if any required email(s) are not received within this time window, appropriate escalation and/or remediation procedures may be carried out).

For a third time period inbound vote process (i.e., from the Voting Entity Computer System 111 to the Data Consolidation Computer System 101), a file named VotingEntityDom_20.dat.pgp may be established. This first time period inbound vote process may occur at about 8 PM, such that the VotingEntityDom_20.dat.pgp file may be expected to be received, for example, every Monday-Friday between 7 PM and 9 PM.

Again, any failure or confirmation emails may be sent and/or received within the appropriate time window (if any required email(s) are not received within this time window, appropriate escalation and/or remediation procedures may be carried out).

For a third time period outbound vote process (i.e., from the Data Consolidation Computer System 101 to the Voting Entity Computer System 111), a file named VotingEntityOutD020.dat may be established. This VotingEntityOutD020.dat file is generated in response to the third time period inbound vote file named VotingEntityDom_20.dat.pgp and this VotingEntityOutD020.dat file may be expected to be processed during a specified time frame (e.g. every Monday-Friday between 7 PM and 10 PM).

Again, any failure or confirmation emails may be sent and/or received within the appropriate time window (if any required email(s) are not received within this time window, appropriate escalation and/or remediation procedures may be carried out).

Continuing with the above-mentioned embodiment of the present invention directed to a consolidated data feed comprising meeting, agenda, director and ballot information, the following provides yet more specific examples of an outbound vote validation process (i.e., from the Data Consolidation Computer System 101 to the Voting Entity Computer System 111). Again, of course, it is to be understood that the various specifics presented in connection with this embodiment (e.g., file names, file types, number of files, event times, etc) are simply examples provided for illustrative purposes only, and are not restrictive (this example refers to outbound file VotingEntityOutD07.dat and inbound file VotingEntityDom_7.dat.pgp, although the process may of course be utilized in connection with other files).

In any case, it is noted that the vote validation file VotingEntityOutD07.dat from the Data Consolidation Computer System 101 to the Voting Entity Computer System 111 is in response to the vote file VotingEntityDom_7.dat.pgp from the Voting Entity Computer System 111 to the Data Consolidation Computer System 101 and that the vote validation file is created and placed on a PGP server. Further, one or more batch programs watch for the vote validation file (e.g., during a designated time window). Once the file is successfully found on the PGP server, a batch file runs the following processes:
1. Encrypts the vote validation file on the PGP server.
2. FTP's the encrypted file from the PGP server to an FTP server.
3. Runs an FTPcheck utility that verifies the "get" process was successfully completed.
4. Archives the file to maintain, for example, 5 generations of the file.
5. Runs an NDM task that generates an email to notify of the successful placement of the file on the FTP server.

Regarding error checking of the above process, it is noted that: (a) if a designated file is not available on the PGP server by a designated time, then an alarm or email may be generated to notify of the failure; (b) if the FTPcheck utility detects a failure in the FTP "put" process the utility may generate a failure alarm or email; and/or (c) if one or more of the batch processes fails to run successfully, an alarm or email may be generated.

In another embodiment of the present invention the Voting Entity Computer System 111 receives files for meetings, agendas, directors and ballots on a specified time frame and during this specified time frame the Data Consolidation Computer System 101 accepts from the Voting Entity Computer System 111 domestic, global, and contest votes.

Further, the following are examples of software programs that may be used to implement various processes associated with the present invention:

A program that creates a report using data captured as part of a billing system. The report displays the specific details behind the billing numbers. In one example (which example is intended to be illustrative and not restrictive), the data being captured may comprise the number of vote instructions being sent to the Voting Entity Computer System 111 at a specified time.

A program that creates a Meeting information file. In one example (which example is intended to be illustrative and not restrictive), this program may check a specified table to determine if a ballot has been created for a particular meeting. If a ballot has been created, then the meeting information pertaining to this ballot is created. If no ballot is found, then the meeting information is not created.

A program that creates a Ballot information file.

A program that creates an Agenda Director Information file. In one example (which example is intended to be illustrative and not restrictive), this program may check a specified table to determine if a ballot has been created for a particular meeting. If a ballot has been created, then the Agenda Director information pertaining to this ballot is created. If no ballot is found, then the Agenda Director information is not created.

A program that processes a file that the Voting Entity Computer System 111 sends on a specified time frame. In one example (which example is intended to be illustrative and not restrictive), this file may contain confirmation of the ballot records the voting entity has received from a prior consolidated data feed. This file may be used to update each individual ballot record on a Ballot table reflecting if ballot was accepted or rejected by the voting entity (and implicitly confirm that meeting and agenda information pertinent to said ballot has also been received and inserted).

A program that creates an Agenda Proposal Information file. In one example (which example is intended to be illustrative and not restrictive), this program may check a specified table to determine if a ballot has been created for a particular meeting. If a ballot has been created, then the Agenda Proposal information pertaining to this ballot is created. If no ballot is found, then the Agenda Proposal information is not created. Also, if no ballot is found, then a notation may be used to mark the records that did not have ballots to allow the Data Consolidation Computer System 101 to check them periodically to determine if a ballot was created for these meetings, so the Data Consolidation Computer System 101 can send them to the Voting Entity Computer System 111.

Regarding the ballot confirmation discussed above, after the ballots have been integrated into the Voting Entity Computer System 111, a ballot confirmation file may be created and then sent back to the Data Consolidation Computer System 101. Once the Data Consolidation Computer System 101 receives this file, the Data Consolidation Computer System 101 may delete the downloaded file(s) and update the ballot files with the result codes and download flags. This may be done as each ballot confirmation is integrated into the Data Consolidation Computer System 101. In one example (which example is intended to be illustrative and not restrictive), the following data elements may be written out to this file: institution ID of the ballot, control number, agenda key, and result code.

Regarding the ballot information, the ballot file may contain, for example, two types of ballots: Unvoted and Voted. Specifically, the ballot may be sent once when it is created and a second time when the Data Consolidation Computer System 101 has processed a voting instruction for the ballot. In one example (which example is intended to be illustrative and not restrictive), a first check may be whether the job number/security combination for a meeting exists; the next check may be whether the agenda exists; the next check may determine if the control number exists. As stated earlier, the ballot may be sent once when it is created and a second time when the Data Consolidation Computer System 101 has processed a vote. The vote information may be sent in several fields, including, but not limited to: vote date field (date vote was recorded by the system), proposal vote field (string of the proposal votes), director vote field (string of director votes for a domestic director proposal). Ballots for contested meetings may be linked to the appropriate committee via the agenda key.

The recipient (e.g. voting entity) of the consolidated data feed may create independent audit reports of those meetings, agenda, directors and/or ballots that fail during the integration process and then take appropriate action concerning how to resolve the issue.

As mentioned above, various files (e.g., which correspond to certain issuer information) may be automatically transferred during a predefined time window between the Data Consolidation Computer System 101 and the Voting Entity Computer System 111. The transferred files may require both a verification of the protocol and an application validation of the data that is transferred at a record level (even though the Voting Entity Computer System 111 may have a different protocol than the Data Consolidation Computer System 101, both the verification and validation steps may be carried out). In one example (which example is intended to be illustrative and not restrictive), the verification step may comprise a confirmation that all of the required issuer information was received by the Voting Entity Computer System 111. Thus, in one example (which example is intended to be illustrative and not restrictive), if ballot information only is sent, the ballot information will not be applied to the Voting Entity Computer System 111 database unless there is also the associated meeting and agenda information attached. Consequently, under this example, if the Data Consolidation Computer System 101 receives confirmation of ballot information, then this necessarily means that the meeting, agenda and ballot information have all been successfully integrated into the Voting Entity Computer System 111 database.

In a further example (which example is intended to be illustrative and not restrictive), the validation step may comprise that, for every voting instruction file that the Data Consolidation Computer System 101 receives, the Data Consolidation Computer System 101 responds with a voting instruction validation file that includes, for example: the number of voting instructions in the transmission; the number of voting instructions accepted; and the number of voting instructions rejected by type of rejection followed by the detail concerning the voting instruction record that was rejected. As such, the validation step may provide information that is necessary to confirm that all of the voting instructions, which were transmitted, are also accounted for.

In yet another embodiment, the present invention provides a voting entity with a system for integrating, organizing and displaying certain issuer information for a plurality of custodians holding positions in the same issuer that can be integrated with any platform (and/or protocol) chosen by the voting entity. For example (which example is intended to be illustrative and not restrictive), each voting entity can use a single application interface to receive certain issuer information from a third party, to transfer voting instructions to the third party and to receive confirmation that the instruction has been processed on the appropriate ballot. In yet another example (which example is intended to be illustrative and not restrictive), the present invention may include a data processing method (and associated system) for providing certain issuer information to a voting entity in a security of an institution held across a plurality of custodians, comprising the steps of: receiving certain issuer information from the plurality of custodians in a common protocol between a proxy agent and the custodians; consolidating the certain issuer information from each custodian into a single consolidated data feed by individual voting entity; distributing the certain issuer information to the voting entity by a controlled hierarchical transfer, wherein the distributing step comprises confirmation of a receipt and confirmation of consolidation with the voting entity; and collecting vote instructions, wherein the distributing step comprises confirmation of vote instructions execution to the voting entity.

In yet another embodiment, the present invention may be utilized for an election relating to, for example, a beneficial proxy, a registered proxy, a corporate action, a contested election, a political election, and/or a trade election In yet another embodiment, the present invention comprises one or more of the following steps: requesting and collecting information on the specific identity of members of a population that are eligible to respond on an issue; identifying the appropriate members of the population; communicating and distributing the information to the members of the population, consolidating the distribution of the responses acquired from different sources; collecting the response on any issues distributed; and returning a confirmation that the response has been received and processed with a recapitulation of the response as instructed.

Of note, the present invention may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, the specific dates, time spans, rates, prices, values and the like described with reference to the various examples are, of course, illustrative and not restrictive. Further still, while the present invention has been described principally with respect to interchanging information with one issuer of securities or their agent (solicitor), the invention could, of course, be configured to interchange information with a plurality of issuers of securities or their agents. Further still, while the present invention has been described principally with respect to interchanging information with one voting entity, the invention could, of course, be configured to interchange information with a plurality of voting entities. Further still, while the present invention has been described principally with respect to interchanging information with one beneficial owner, the invention could, of course, be configured to interchange information with a plurality of beneficial owners. Further still, while the present invention has been described principally with respect to interchanging information with two custodians, the invention could, of course, be configured to interchange information with a different number of custodians. Further still, the present invention may be used in connection with any identifiable population eligible to respond to an issue. Further still, various securities exchanges (e.g., the New York Stock Exchange, the American Stock Exchange, the NASDAQ) may send and/or receive information for use hereunder. Further still, actual votes can be substituted for voting instructions.

What is claimed is:

1. A computer implemented method, comprising:
   periodically and electronically transmitting, by a specifically programmed data consolidation computer system, to a computer system of a voting entity, at least one consolidated data feed related to voting events of a plurality of issuers based at least in part on account data received from a plurality of custodians, wherein the account data comprises:
   i) account information regarding a plurality of accounts associated with a plurality of beneficial owners who have designated the vote entity as their voting agent, and
   ii) share positions identifying ownership of the plurality of beneficial owners in securities of the plurality of issuers;
   wherein the at least one consolidated data feed comprises ballots related to the voting events of the plurality of issuers and associated with the plurality of beneficial owners;
   periodically receiving, by the specifically programmed data consolidation computer system, within at least one pre-determined time window, from the computer system of the voting entity, a plurality of voting instructions in response to the at least one consolidated data feed related to the voting events of the plurality of issuers, wherein the at least one pre-determined time window is assigned based at least in part on a particular type of each vote instruction;
   automatically validating, upon the receipt, by the specifically programmed data consolidation computer system, the plurality of voting instructions;
   electronically transmitting, upon the validation and within the at least one pre-determined time window, by the specifically programmed data consolidation computer system, to the computer system of the voting entity, voting instruction validation data identifying a validation result for the plurality of voting instructions;
   matching, by the specifically programmed data consolidation computer system, each validated voting instruction to a particular custodian from the plurality of custodians based on the account information and the share positions of the account data;
   submitting, by the specifically programmed data consolidation computer system, a plurality of validated voting instructions, matched to the particular custodian of the plurality of custodians, in tabulation for the particular issuer; and
   transmitting, upon the submission for the tabulation, by the specifically programmed data consolidation computer system, to the computer system of the voting entity, a plurality of ballot records confirming that the validated voting instructions, matched to the particular custodian from the plurality of custodians, have been included in the tabulation for the particular issuer.

2. The method of claim 1, wherein each plurality of voting instructions of each type is transmitted in a distinct file within at least one distinct pre-determined time window.

3. The method of claim 1, wherein the account data comprises: (a) names of the beneficial owners; (b) addresses of the beneficial owners; and (c) account numbers associated with the beneficial owners.

4. The method of claim 1, wherein at least one beneficial owner is an institutional shareholder.

5. The method of claim 1, wherein the particular type of each voting instruction relates to at least one of: (a) a domestic vote; (b) a contest vote; and (c) a non-North American vote.

6. The method of claim 1, wherein the each custodian corresponds to at least one nominee.

7. A data consolidation computer system, comprising:
   at least one specialize computer machine, comprising:
   a non-transient memory having at least one region for storing particular computer executable program code; and
   at least one processor for executing the particular program code stored in the memory, wherein the particular program code is configured to at least perform the following operations:
   periodically and electronically transmitting, to a computer system of a voting entity, at least one consolidated data feed related to voting events of a plurality of issuers based at least in part on account data received from a plurality of custodians, wherein the account data comprises:
   i) account information regarding a plurality of accounts associated with a plurality of beneficial owners who have designated the vote entity as their voting agent, and
   ii) share positions identifying ownership of the plurality of beneficial owners in securities of the plurality of issuers;
   periodically receiving within at least one pre-determined time window, from the computer system of the voting entity, a plurality of voting instructions in response to the at least one consolidated data feed related to the voting events of the plurality of issuers, wherein the at least one pre-determined time window is assigned based at least in part on a particular type of each vote instruction;
   automatically validating, upon the receipt, the plurality of voting instructions;
   electronically transmitting, upon the validation and within the at least one pre-determined time window, to the computer system of the voting entity, voting instruction validation data identifying a validation result for the plurality of voting instructions;

matching each validated voting instruction to a particular custodian from the plurality of custodians based on the account information and the share positions of the account data;

submitting a plurality of validated voting instructions, matched to the particular custodian of the plurality of custodians, in tabulation for the particular issuer; and transmitting, upon the submission for the tabulation, to the computer system of the voting entity, a plurality of ballot records confirming that the validated voting instructions, matched to the particular custodian from the plurality of custodians, have been included in the tabulation for the particular issuer.

8. The system of claim 7, wherein each plurality of voting instructions of each type is transmitted in a distinct file within at least one distinct pre-determined time window.

9. The system of claim 7, wherein the account data comprises: (a) names of the beneficial owners; (b) addresses of the beneficial owners; and (c) account numbers associated with the beneficial owners.

10. The system of claim 7, wherein at least one beneficial owner is an institutional shareholder.

11. The system of claim 7, wherein the particular type of each voting instruction relates to at least one of: (a) a domestic vote; (b) a contest vote; and (c) a non-North American vote.

12. The apparatus of claim 7, wherein the each custodian corresponds to at least one nominee.

13. A computer implemented voting method, comprising:
a) receiving, by a specifically programmed computer system, issuer information from an issuer or an agent of the issuer; wherein the issuer information is related to a vote solicited from a plurality of beneficial owners who beneficially owns securities of the issuer;
b) converting, by the specifically programmed computer system, the issuer information in accordance with at least one protocol of a voting entity; wherein the at least one protocol associates the issuer information with at least one meeting identifier;
c) storing, by the specifically programmed computer system, the converted issuer information in at least one database;
d) receiving on a periodic basis, by the specifically programmed computer system, share positions for the plurality of beneficial owners wherein the share positions comprise:
(1) an identify of at least one owned security,
(2) a number of shares of the at least one owned security, and
(3) a time period during which each beneficial owner owns the at least one security;
e) providing, based at least in part on the positional information, by the specifically programmed computer system, at least a portion of the issuer information to the beneficial owners;
f) collecting, by the specifically programmed computer system, voting instructions from beneficial owners for the voting solicited by the issuer;
g) aggregating, by the specifically programmed computer system, the collected voting instructions;
h) reporting, by the specifically programmed computer system, the aggregated information about the collected voting instructions to the issuer or a third party; and
i) wherein the computer system of the voting entity performs steps a)-h) so that an identity of each beneficial owner is safeguarded.

14. The computer implemented voting method of claim 13, wherein the issuer information comprises a proxy ballot.

15. A computer-implemented system, comprising:
at least one specifically programmed computer machine, comprising:
a non-transient memory having at least one region for storing particular computer executable program code; and
at least one processor for executing the particular program code stored in the memory, wherein the particular program code is configured to at least perform the following operations:
a) receiving issuer information from an issuer or an agent of the issuer; wherein the issuer information is related to a vote solicited from a plurality of beneficial owners who beneficially owns securities of the issuer;
b) converting the issuer information in accordance with at least one protocol of a voting entity; wherein the at least one protocol associates the issuer information with at least one meeting identifier;
c) storing the converted issuer information in at least one database;
d) receiving on a periodic basis share positions for the plurality of beneficial owners wherein the share positions comprise:
(1) an identify of at least one owned security,
(2) a number of shares of the at least one owned security, and
(3) a time period during which each beneficial owner owns the at least one security;
e) providing, based at least in part on the positional information, at least a portion of the issuer information to the beneficial owners;
f) collecting voting instructions from beneficial owners for the voting solicited by the issuer;
g) aggregating the collected voting instructions;
h) reporting the aggregated information about the collected voting instructions to the issuer or a third party; and
i) wherein the computer-implemented system of the voting entity performs operations a)-h) so that an identity of each beneficial owner is safeguarded.

16. The computer-implemented system of claim 15, wherein the issuer information comprises a proxy ballot.

* * * * *